Aug. 9, 1938.  H. M. GOHEEN  2,126,105
RAKE TOOTH CLEANER
Filed Jan. 26, 1937  2 Sheets-Sheet 1
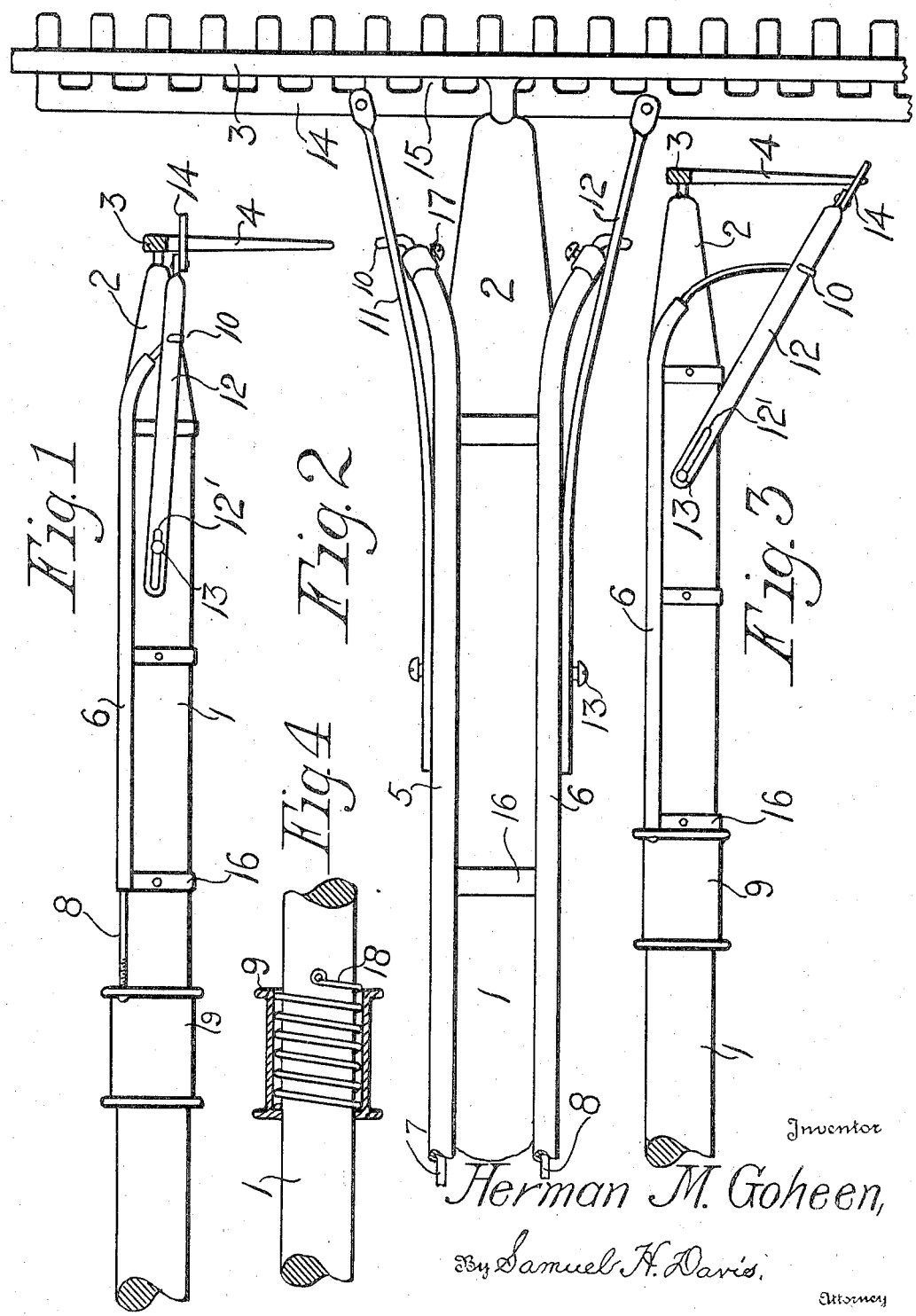
Inventor
Herman M. Goheen,
By Samuel H. Davis.
Attorney

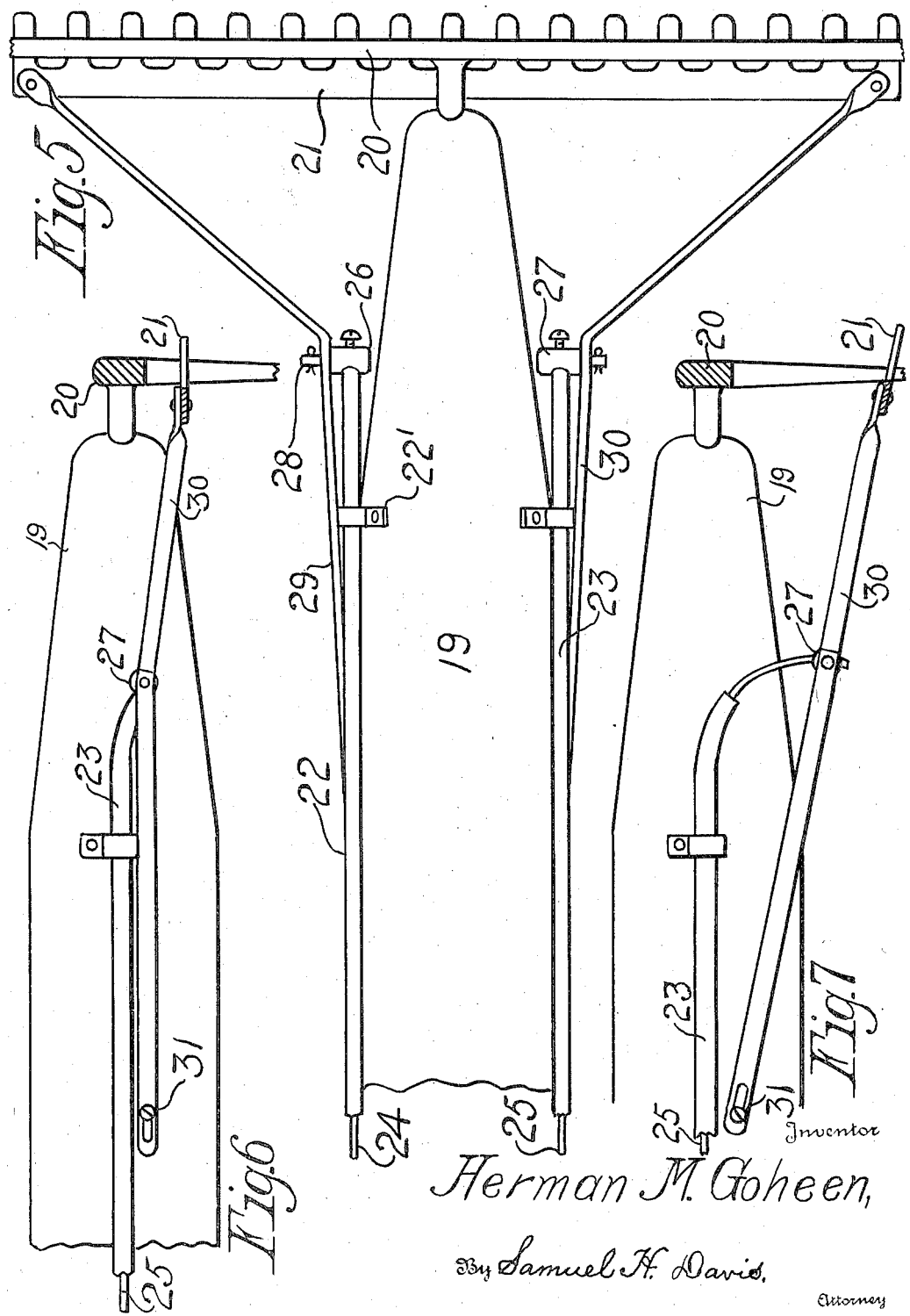

Patented Aug. 9, 1938

2,126,105

UNITED STATES PATENT OFFICE 2,126,105

RAKE TOOTH CLEANER

Herman M. Goheen, Lansing, Mich.

Application January 26, 1937, Serial No. 122,467

4 Claims. (Cl. 55—146)

This invention relates to rake tooth cleaners, more particularly to devices attached to a rake for clearing the teeth of accumulated leaves, grass, twigs etc., gathered up in the ordinary use of the implement.

It is the object of this invention to provide a combination of parts for freeing the row of teeth from collected material, the devices being hand operated conveniently by the user of the rake, and being of special construction and arrangement believed to be of simple mechanical character, readily and cheaply manufactured and assembled, and not apt to get out of order in use.

In the accompanying drawings illustrating the various parts of this invention and their relative positions, Fig. 1 represents a side view of all parts assembled showing the cleaner member in its raised position.

Fig. 2 is a top view somewhat enlarged showing the divergent arrangement of the operating levers.

Fig. 3 is a side view similar to Fig. 1, showing the cleaner member in its lower position.

Fig. 4 is a sectional view of the hand grip slide, showing a coil spring arranged to act upon the slide to hold the same in place yieldingly when the cleaner member is in its raised position.

Fig. 5 is a top view similar to Fig. 2, showing all parts assembled, and illustrating a modified form of this invention.

Fig. 6 is a side view similar to Fig. 1, showing the modified form with the cleaner member in its raised position.

Fig. 7 is a side view similar to Fig. 3, showing the modified form of this invention with the cleaner member in its lower position.

Throughout the drawings and description the same number is used to refer to the same part.

Considering the drawings, it is not intended to limit this invention to any special size or form of rake, or to the particular shapes and precise arrangement of the parts set out, as modifications thereof are readily discernible. A rake handle 1, has the customary conical end socket 2 connected with the usual tooth bar or back 3 having a row of teeth 4 of any number and configuration. Carried by the handle at the sides thereof and extending lengthwise of the handle are twin tubes 5 and 6 through which move resilient steel wires 7 and 8. At one end the wires are attached to a hand grip 9, and the grip is adapted to slide upon the handle. It will be noted that the other ends of the wires pass out through curving ends of the tubes, and each wire has a bent end such as the end 10 pivotally engaging the divergent levers 11 and 12. The levers are arranged at the sides of the handle, and each lever has one end constructed with a longitudinal slot such as the slot 12', and a pivot pin or screw such as 13, one for each lever, passes through the slots into the handle thereby connecting the levers pivotally and lengthwise movably with the handle. The outer ends of the levers are attached as illustrated to the cleaner bar or member 14, which has the tongues or extensions 15 passing between the teeth of the rake.

The twin tubes 5 and 6 may be secured in position upon the handle by suitable bands 16 pinned to the handle, or in an equivalent manner secured.

In Fig. 2 are shown on the wires the screw fastened stop blocks 17, which may be employed to limit the lift of the cleaner member in use.

Considering Fig. 4, the hand grip slide 9 is provided interiorly with a coil spring 18 encircling the handle. This spring is introduced to yieldingly keep the hand grip in its place when the cleaner is in raised position and the rake is being used.

Considering the modification illustrated in Figs. 5, 6, and 7, the handle 19 is terminated with a rake 20 provided with a cleaner member 21 as previously explained. Tubes 22 and 23 are suitably secured along the sides of the handle and the resilient steel wires 24 and 25 pass through the tubes and out of the curved ends of the tubes where the wires are secured at their ends in the stop blocks or anchor pieces 26 and 27. Each of the pieces has a projecting pintle such as 28, and the pintles pass pivotally through the angular levers 29 and 30 near the bends in the levers. As shown in Fig. 5 the ends of the levers diverge and are secured to the cleaner member 21. The levers are pivotally attached to the sides of the handle by screws or pins 31. Clips 22' hold the side tubes on the handle.

In the operation of this invention, it is believed to be apparent from the drawings of either form of the invention that as the hand grip is moved back and forth upon the handle, the cleaner member is moved correspondingly up and down and its projections between the teeth of the rake detach any gathered rubbish. As the cleaner member is lowered and raised, the steel spring wires pass through the tubes, and the ends of the wire bend and unbend accordingly.

Having now described this invention and its use, I claim:—

1. In a rake tooth cleaner, in combination, a handle, a series of rake teeth transversely secured at the end of the handle, a correspondingly toothed cleaner bar engaging the rake teeth, a pair of tubes secured lengthwise upon opposite sides of the handle, the said tubes terminating at a distance from the rake teeth, a pair of levers secured pivotally to the sides of the handle below the said tubes, each of said levers having a lengthwise slot and a pivot pin passing through the slot into the said handle, the said levers having each an end attached to the said cleaner bar, a pair of push wires passing through the said tubes and having ends pivotally connected with the said levers between the ends of the levers whereby the levers may be given a lengthwise and downward movement, a sliding hand grip movable along the handle and attached to the said wires, and the said hand grip having a coil spring attached to the handle and acting upon the hand grip whereby the grip is held yieldingly in its retracted position and the said cleaner bar is held movably in its raised position.

2. In a rake tooth cleaner, in combination, a handle, a series of rake teeth transversely secured at the end of the handle, a correspondingly toothed cleaner bar engaging the rake teeth, a tube secured lengthwise upon the handle, the said tube terminating at a distance from the rake teeth, a lever secured pivotally to a side of the handle adjacent the rake end of said tube, said lever having a lengthwise slot and a pivot pin passing through the slot into the said handle, said lever also having an end attached to the cleaner bar, a push wire passing through the tube and having an end connected with said lever between the ends thereof, whereby the lever may be given a lengthwise and downward movement, and a hand grip movable along the handle and attached to the other end of said wire.

3. In a rake tooth cleaner, in combination, a handle, a series of rake teeth transversely secured at the end of the handle, a correspondingly toothed cleaner bar interengaged with the rake teeth, a tubular section secured to the handle with its axis extending lengthwise thereof, a lever attached by one end to the cleaner bar, said lever having a lengthwise slot and a pivot pin passing through the slot into said handle, a flexible push wire passing through and supported by the tubular section and having an end connected with said lever between the ends thereof, whereby the lever may be given a lengthwise and downward movement, and a handle grip movable with respect to the handle and connected to the other end of said wire.

4. In a rake tooth cleaner, in combination, a handle, a series of rake teeth transversely secured at the end of the handle, a correspondingly toothed cleaner bar interengaged with the rake teeth, a lever attached by one end to the cleaner bar, said lever having a lengthwise slot and a pivot pin passing through the slot into said handle, a flexible push wire having an end connected with said lever between the ends thereof, whereby the lever may be given a lengthwise and downward movement, means for supporting and guiding the wire with respect to said handle, and a handle grip movable with respect to the handle and connected to the other end of said wire.

HERMAN M. GOHEEN.